Nov. 23, 1965 D. S. J. SMITH 3,219,999
ASYNCHRONOUS TRANSLATOR
Filed Feb. 8, 1963
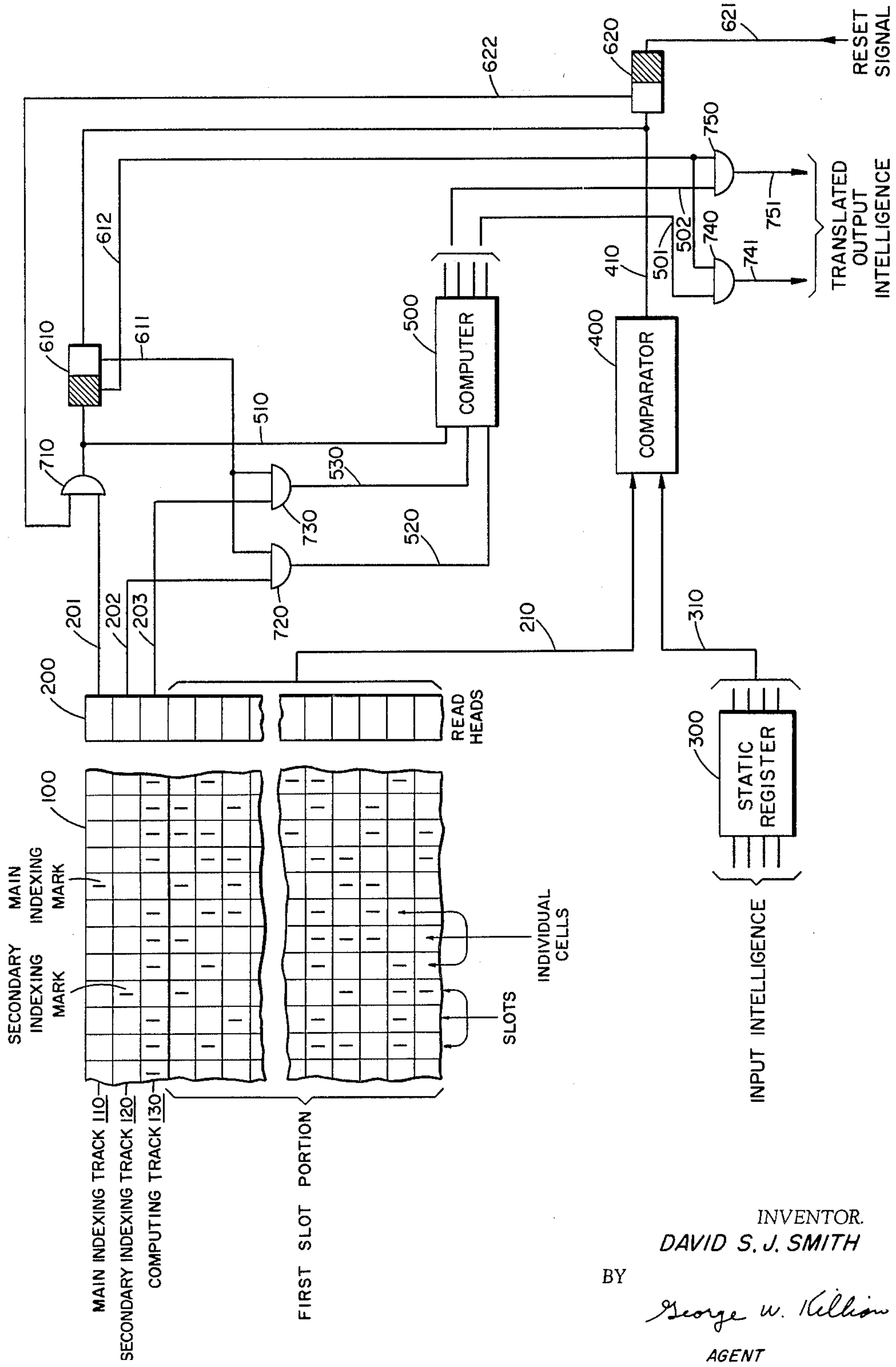
INVENTOR.
DAVID S. J. SMITH
BY George W. Killian
AGENT United States Patent Office 3,219,999
Patented Nov. 23, 1965

3,219,999
ASYNCHRONOUS TRANSLATOR

David S. J. Smith, Ontario, N.Y., assignor to General Dynamics Corporation, Rochester, N.Y., a corporation of Delaware Filed Feb. 8, 1963, Ser. No. 257,131
6 Claims. (Cl. 340—347)

This invention relates in general to translators and, more particularly, to an asynchronous translator for converting a first coded intelligence to a second coded intelligence.

Although the invention herein disclosed is suitable for more general application, it is particularly adapted for use in an automatic telephone system of the time division multiplex type. In such systems, maximum speed, efficiency, and economy could be maintained if it were permissable to shift subscribers' connections from one terminal to another as the pattern of traffic and load conditions changed over a period of time. However, such shifting would result in directory changes and create subscriber confusion and hostility as well as require a corresponding increase in intercept and information services. Accordingly, such changes must be kept to a practical minimum. However, a system in which the directory number can be independent of the particular terminals a subscriber's line is connected to will provide the desired flexibility without the corresponding disadvantages. In addition, such a system will permit customer moves and/or changes in grade of service without affecting the directory number. Such systems are not novel and are usually equipped with some type of translating equipment which accepts the dialed directory number and translates it to the code required to complete the connection from the calling line to the called line. If the connection of the called line is, for any reason, subsequently connected to different terminating equipment, all that is required is to make a corresponding change in the translator memory so that the given dialed number will be translated to the new code number required to complete the connection to the new called terminal.

Various types of translators have been proposed for such systems. For example, translating matrices comprising cores, or other devices, have been proposed. In addition, magnetic surface drums have been employed. However, since it is impractical to synchronize the rotation of a magnetic drum with the high-speed clock pulses of a time division multiplex system, the selection of a drum system has dictated the need for buffer memories to store signals indicative of the intelligence to be translated, and the signals indicative of the translated intelligence so that the intelligence may be inserted into and removed from the buffer stores in the appropriate time slot. Furthermore, the drum required a large number of tracks in order to be able to register in one slot both the number to be translated and the translated number; that is, both the directory number and the corresponding code required to complete the connection to the called line.

It is the general object of this invention to provide a new and improved translator.

It is a more particular object of this invention to provide a new and improved asynchronous translator for translating intelligence from a first form to a second form.

it is another object of this invention to provide a new and improved translator employing a cyclic memory medium.

It is another object of this invention to provide a new and improved translator employing a cyclic memory medium having a reduced number of memory channels.

It is another object of this invention to provide a new and improved translator employing a cyclic memory medium wherein the intelligence to be translated is recorded in a particular slot which is indicative of the required translation.

It is another object of this invention to provide a new and improved translator for use in a system wherein the translated intelligence is computable.

It is another object of this invention to provide a new and improved translator for use in a system wherein there is a one-to-one correspondence between the intelligence to be translated and the translated intelligence.

In accordance with a preferred embodiment of the present invention, the translator memory includes a magnetic drum which is divided into a plurality of closed loop tracks, each extending around the circumference of the drum surface. Each of the tracks is divided into an equal number of cells and a transducing means is provided for each track to detect any magnetic signals registered in the cells of their respective tracks. The group of cells which are under the transducing means of their respective tracks at a given instant comprise a collection of cells referred to as a slot. Thus, each slot includes one cell from each track and there are as many slots as there are cells in any one of the tracks. The cells in the first portion of each of the slots are used for recording information indicative of the intelligence to be translated by the cells, while the second portion of each of the slots is used for recording information indicative of the translated intelligence. If the intelligence to be translated comprises a four-digit number, the first portion of each slot might include sixteen cells if the information is registered in a decimal binary system, which is a common and convenient system employing four tracks per digit. If the corresponding translated intelligence also comprises a four-digit number, the second portion of each slot might also be expected to include sixteen cells to accommodate the registration of the translated number in the same manner. However, as will be shown, a material reduction in the number of cells required in the second portion of each slot is possible when there is a one-to-one correspondence between the numbers to be translated and the corresponding translated numbers, and when the translated numbers form a group, or groups, of numbers which comprise an orderly progression. This is the condition which will prevail in a typical telephone system since only one directory number is used to access a given subscriber and since the called terminals are normally included in orderly consecutive number groups. Accordingly, in a system having a one-to-one correspondence, one of the plurality of slots may be selected as an indexing slot and identified as such by an appropriate recording in an appropriate cell of one of the tracks in the second portion of the slot. Then, each of the other slots in the system is a unique number of slots, in a given direction, from the indexing slot. Accordingly, an individual translated number may be assigned to each of the slots and the translated number corresponding to an individual slot may thereafter be determined if the number of slots separating the individual slot from the indexing slot can be determined or computed. The number of slots separating an individual slot from the indexing slot may be readily computed by providing a counter which is set to a predetermined setting each time the indexing slot passes under the transducing means and which advances step-by-step as successive slots pass under the transducing means. In a practical system, the translated number will usually fall within one or a very limited number of groups of consecutive numbers. If the translated numbers fall within a single group of consecutive numbers, then the indexing slot can be used to set a counter to an appropriate initial setting and the counter can be advanced one step per slot so that the setting of the counter corresponds to the translated number of the slot then under the transducing heads. If the translated numbers fall within more than one group of orderly numbers, then appropriate slots may be used as secondary indexing slots to set the counter to the appropriate starting position for each of the orderly groups of numbers. By employing this technique, the number of cells in the second portion of each slot may be materially reduced. One track in the second portion of the slots would provide the signal for indicating the location of the main indexing slot and another track in the second portion of the slots would provide a signal per slot to advance the counter step-by-step. When required, a third track could provide signals indicative of secondary indexing slots. Accordingly, by the outlined technique, the desired translated output number may be determined with the use of two or three tracks rather than the sixteen or more tracks that otherwise might be required to register the four-digit translated number. It is to be understood that the intelligence to be translated must be permanently registered in the cells of the slot corresponding to the required translated number. That is, the desired result of the translation to be performed determines the slot in which the number to be translated must be registered.

When the system incorporating the translator of the present invention requires the translated number corresponding to a given number to be translated, the given number will be temporarily registered in a static store. In a time division multiplex system, the number to be translated will have been obtained from a particular time slot in the time division multiplex equipment and the corresponding translated number will have to be registered in a buffer store until the time division multiplex system is prepared to read it out. A comparator is used to compare the numbers being read from the first portions of the slots on the drum surface with the number registered in the static store. When an identity between the two is detected, an indicating signal is provided as an output from the comparator. As previously outlined, a counter is provided which is set to a predetermined initial count when the indexing signal is detected and which responds to successive signals per slot so that the counter always has registered therein the translated number corresponding to the number to be translated then being read from the drum by the transducing means. When the indicating signal is produced by the comparator, the counter is made insensitive to successive advancing signals as the drum continues its rotation and the counter is therefore frozen at the translated number corresponding to the number to be translated which is registered in the static store. Accordingly, the counter provides the double function of computing, or counting up to the translated number, and of serving as the buffer store for the translated number.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawing which illustrates a preferred embodiment of the invention in logic diagram form.

It is to be understood that only the details of the circuit necessary to understand the invention have been shown in the illustrated embodiment. Furthermore, the invention is illustrated in logic diagram form as it is believed that the inclusion of circuit details for old and well known devices, such as AND gates and flip-flops, would only tend to mask or obscure the invention described herein. Typical circuit details for the logic symbols shown are well known to those skilled in the art or may be seen in Patent No. 2,979,570, issued on April 11, 1961, to Barrie Brightman.

AND gates are represented in the drawing by a symbol which has the general shape of a D. The inputs to an AND gate are drawn to the straight line part of the D while the output is drawn from the arcuate portion of the D. All the AND gates illustrated in the drawing are of the type that will provide a negative output potential only when all the inputs are negative. When any one or more of the inputs to an AND gate are positive, the output potential will rise to a more positive potential.

Flip-flop circuits are represented by a rectangle divided into two squares, to represent the two portions of a typical flip-flop circuit. The square representing the reset portion of the flip-flop is shaded while the square representing the set portion of the flip-flops is not shaded. The input signals to reset or set the flip-flops are applied to the shorter sides of the rectangle. The flip-flops used in the illustration are of the type which respond only to positive transients of input signals. When a flip-flop has been reset by a positive transient, a steady state ground marking potential is provided on an output lead from the reset side of the flip-flop and a steady state negative marking potential is provided on an output lead from the set side of the flip-flop. When the flip-flop is set, the marking potentials on the output leads are reversed.

In the illustrated embodiment of the invention, 100 represents a portion of the surface of a magnetic drum. However, any other type of cyclic memory medium could be employed, for example, the cyclic memory medium might comprise one or more delay lines with the signals being recirculated therethrough. The illustrated drum surface is arranged to be driven at a uniform speed past the read heads 200. The drum surface 100 may be considered to be divided into a plurality of tracks, each of which extends around the drum surface. The tracks 110, 120 and 130 are designated the main indexing track, the secondary indexing track, and the computing track, respectively. Each track is divided into a plurality of cells with the same number of cells per track. Those cells which are under the read heads 200 at a given instant comprise a group of cells known as a slot. If the read heads are assumed to be in alignment, then those cells which are in a vertical column form a slot. The cells which are not part of the tracks 110, 120 and 130 form a first portion of their respective solts and the cells which are part of the tracks 110, 120 and 130 form a second portion of their respective slots.

The read heads 200 comprise means for reading any signals registered on the recording medium 100. There is one read head per track.

The static register 300 may assume any convenient form. For example, it may include groups of flip-flop circuits which may be selectively set or reset for registering any desired input intelligence. To provide means for setting the register 300, there is shown a plurality of input leads on the left-hand side thereof. Signals indicative of the intelligence that is registered in register 300 is applied to the group of leads represented by line 310. That is, positive or negative potentials applied to the output leads of register 300 provide a coded indication of the intelligence registered therein. Accordingly, the intelligence registered in register 300 may be read, or inspected, by comparator 400.

The output signals from the read heads 200 which are associated with the tracks forming the first slot portion of each of the slots are connected to the comparator 400 by the group of leads represented by line 210. Accordingly, by means of a group of exclusive OR gate circuits included in comparator 400 it is possible to obtain an output signal from the comparator on lead 410 only when the signals appearing on leads 210 are identical to the signals appearing on leads 310.

The computer 500 may comprise a counter which advances through an orderly progression of settings in response to successive signals on a first input lead and which may be set to predetermined settings in response to an input signal on one or more other input leads. More specifically, each successive signal on lead 530 will advance the collector through its orderly progression of settings, while a signal on lead 510 will set the computer to a specific predetermined one of its possible settings. The first signal on lead 520 will set the computer to another predetermined one of its settings, and subsequent signals on lead 520 will set the computer to other specific predetermined settings. Thus, signals on lead 530 will provide for an orderly advancement of the computer from whatever specific predetermined setting the computer had been set to by the last signal on leads 510 or 520. As may be seen, the signals on leads 510, 520 and 530 are derived from tracks 110, 120 and 130, respectively. The present invention presupposes a computer which is designed to have sufficient capacity to provide a unique setting corresponding to each slot of the cyclic medium 100. Accordingly, by the judicious registration of coded intelligence in the first portion of a selected slot, it is possible to translate that intelligence to the intelligence represented by the setting of the computer corresponding to the unique setting of the computer for that slot.

The translation is accomplished by registering in static register 300 coded intelligence which is identical to the coded intelligence to be translated. The cyclic medium 100 is put into motion so that the read heads 200 may read the signals registered on the medium. It will be assumed for the purposes of this discussion that a reset signal has been applied to lead 621 and that, therefore, flip-flop 620 is in the reset condition. Accordingly, lead 622 will have a negative potential applied thereto, thereby providing an enabling potential to AND gate 710. Therefore, when the main indexing mark in track 110 is detected by the top read head 200, a pulse will be passed on lead 201 and through AND gate 710 to lead 510, which will reset flip-flop 610 and set computer 500 to a specific predetermined one of its many possible settings. The resetting of flip-flop 610 will provide a negative enabling potential on lead 611 to enable AND gates 720 and 730. In addition, an inhibiting potential will be applied to lead 612 to inhibit the group of gates represented by AND gates 740 and 750. With AND gate 730 enabled, the next mark recorded in the computing track 130 will be detected by the third read head and a negative pulse will be applied to lead 203 and will pass through AND gate 730 to computer 500. The pulse thus applied to computer 500 will cause it to advance from its specific setting to the first setting in an orderly progression of settings. Successive pulses on lead 203 will advance the computer 500 step-by-step through the orderly progression of settings. The detection of a secondary indexing mark in track 120 will cause a pulse to be applied to lead 202 and through AND gate 720 to the computer 500, which will respond by adjusting itself to some other specific setting which normally will not represent a setting corresponding to an orderly progression of the computer from its prior setting. That is, the computer will usually be advanced to a later setting. In response to each successive pulse on lead 203, the computer will advance through a second group of settings in an orderly progression. In this manner, the computer 500 is made to assume a different setting for each slot position and, furthermore, any particular setting of the computer corresponds to a particular slot position. When the cyclic medium has gone through a full cycle, the computer will be reset to its initial setting by the main indexing mark in track 110.

The information read from the first slot portions of the successive slots by the remaining heads 200 is applied in the form of pulses to the comparator 400 via the group of leads represented by the line 210. The comparator 400 compares the input signals just mentioned with the potentials applied to the group of leads represented by the line 310 and which are indicative of the intelligence registered in register 300. When the comparator detects an identity, indicating that the intelligence just read from one of the slots represents the same intelligence as that registered in register 300, an output signal will be applied to lead 410. The pulse on lead 410 will set flip-flops 610 and 620 which, in turn, will remove the enabling potential from AND gates 720, 730 and 710, thereby preventing any signals read from tracks 120, 130 or 110 from changing the setting of the computer 500. That is, the computer will be frozen at the setting it had when the comparator 400 detected the identity.

The setting of flip-flop 610 removed the inhibiting potential from lead 612 and substituted an enabling potential therefor. Accordingly, the group of AND gates represented by gates 740 and 750 will be enabled. The computer 500 will apply signals to a group of output leads, represented by lines 501 and 502, which are indicative of the setting which has been frozen into the computer. Therefore, signals indicative of the setting of the computer will be applied as an output on the group of leads represented by lines 741 and 751 to provide signals indicative of the translated output intelligence. Accordingly, input intelligence to be translated may be applied as an input to register 300 and the corresponding translated output intelligence will be applied to leads 741 and 751.

When another translation is to be performed, a reset signal will be applied to lead 621, thereby resetting flip-flop 620 in the manner previously described.

As suggested, this translator will find particular utility in telephone systems wherein digits, as dialed, are registered and thereafter translated for routing purposes.

It has been suggested that the computer 500 should have sufficient capacity so that it can have a unique setting corresponding to each slot of the cyclic memory medium 100. However, if it is necessary in a particular system to be able to translate two or more different pieces of input intelligence to one common piece of translated output intelligence, it would be possible, by omitting one or more of the marks in track 130, for the computer 500 to remain at the same setting for two or more successive slots. Or, the computer 500 could be set back to a previous setting by one of the secondary indexing marks in track 120.

The facility with which the equipment described herein will permit the translation of two or more different input codes to one common output code will permit the accessing of frequently called numbers with an abbreviated code. That is, telephone subscribers may be allowed to complete a connection to a frequently called number by dialing a simple two or three digit code. To provide this feature, the coded representation of the assigned directory number would be recorded in the first slot portion of the appropriate slot corresponding to the desired translated number and the coded representation of the abbreviated code would be recorded in the first slot portion of the next slot. The computer 500 would be kept from advancing as the transducing means moves from said appropriate slot to the next slot by omitting the recording in the cell of the computing track 130 of said next slot. This feature would be particularly useful in permitting rapid access to emergency numbers, such as fire or police numbers.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. A translator for translating any particular one of a group of different arbitrary codes into a preselected one of a predetermined orderly series of numbers on a one-to-one correspondence basis, said translator comprising a storage device having information stored therein in each of a given number of separate slots, the information stored in each slot comprising a first portion and a second portion, a counter having a count capacity at least equal to said given number of separate slots, storage device readout means for scanning said slots and sequentially applying only said first portion of said stored information from each slot to said counter for setting said counter to the first number of said series in response to said first portion of said stored information from a certain slot and advancing the count of said counter to the next number in said series in response to said first portion of said stored information from each successively scanned slot, whereby each slot corresponds to a different number in said series, said second portion of said information in each slot comprising that arbitrary code which corresponds with the number in said series which corresponds with that slot, a comparator for producing an output in response to first and second identical inputs being simultaneously applied thereto, said storage device readout means sequentially applying said second portion of stored information from each slot as said first input to said comparator simultaneous with the application of said first portion of said stored information from that slot to said counter, static means for applying said particular one of said group of different arbitrary codes as said second input to said comparator, disabling means responsive to an output from said comparator for disabling said counter from counting further, whereby the number manifested by said counter when it is disabled is the number in said series corresponding to said particular one of said group of arbitrary codes, and counter output means for reading out the count manifested by said disabled counter.

2. The translator defined in claim 1, wherein said storage device readout means cyclically scans said slots, and further comprising reset signal applying means for applying a reset signal and enabling means responsive to the application of said reset signal for enabling said counter in response to the next occurring readout of said certain slot.

3. The translator defined in claim 2, wherein said storage device comprises a multi-track rotatable magnetic drum having said information stored thereon, said storage device readout means comprising a group of read heads each of which is in cooperative relationship with a different one of the tracks of said drum for reading out said stored information in each slot as said slot is rotated by said heads.

4. The translator defined in claim 3, wherein said first portion of said stored information in said certain slot consists of a single bit recorded in a given track of a first plurality of tracks of said drum in said certain slot, wherein said first portion of said stored information of each slot other than said certain slot consists of a single bit recorded in a track of said first plurality of tracks other than said given track of said drum in each slot other than said certain slot, and wherein said second portion of said stored information of each slot consists of a unique combination of bits recorded in preselected ones of a second plurality of tracks of said drum in each of said slots.

5. The translator defined in claim 4, wherein said enabling means comprises a first flip-flop which is switched into a reset condition in response to a reset signal being applied thereto, a first AND gate, means for applying a first input to said first AND gate only in response to said first flip-flop being in its reset condition, means coupled to the read head individual to said given track for applying a second input to said first AND gate only in response to said single bit of said certain slot being read out, a second flip-flop, means for applying an output from said first AND gate to said second flip-flop to switch said second flip-flop to a reset condition and to said counter to set the count of said counter to the first number of said series, a second AND gate, means for applying a first input to said second AND gate only when said second flip-flop is in its reset condition, means coupled to a read head individual to a track of said first plurality of tracks other than said given track for applying a second input to said second AND gate only in response to each bit readout therefrom, and means for applying the output of said second AND gate to said counter to advance the count of said counter in response thereto, wherein said disabling means includes means responsive to an output from said comparator for switching both said first and second flip-flops to a set condition, and wherein said counter output means includes readout AND gate means having a first input applied thereto from said second flip-flop only when said second flip-flop is in its set condition and having the output from said counter applied thereto as a second input thereto, whereby the output of said readout AND gate means manifests the number in said series corresponding to said particular one of said arbitrary codes.

6. The translator defined in claim 5, wherein said series of numbers is composed of successive groups of numbers, said counter being set to the first number in the first-occurring group in response to the output of said first AND gate, wherein a first track of said first plurality of tracks other than given track has a bit recorded only in each of predetermined slots which corresponds respectively to the first number in each group other than said first-occurring group, wherein a second track of said first plurality of tracks other than said given track has a bit recorded only in each slot intermediate said certain slot and each of said predetermined slots which corresponds respectively to each number of said series other than a first number of a group, wherein said second input of said second AND gate is obtained in response to each bit from said first track being readout by the read head individual thereto and the output of said second AND gate is applied to said counter to advance the count of said counter to manifest the next first number of a group in response thereto, and further including a third AND gate, means for applying a first input to said third AND gate only when said second flip-flop is in its reset condition, means coupled to the read head individual to said second track for applying a second input to said third AND gate only in response to each bit readout therefrom, and means for applying the output of said third AND gate to said counter to advance the count of said counter to manifest the next number in said series other than a first number of each group in response thereto.

References Cited by the Examiner

UNITED STATES PATENTS 2,934,272 4/1960 Ayres et al. -------- 235—177

MALCOLM A. MORRISON, *Primary Examiner.*